(12) United States Patent
Miyajima et al.

(10) Patent No.: US 7,128,346 B2
(45) Date of Patent: Oct. 31, 2006

(54) STRUCTURE FOR CONNECTING TUBULAR MEMBER TO FUEL TANK

(75) Inventors: Atsuo Miyajima, Aichi-ken (JP); Tomohide Ito, Aichi-ken (JP); Hiroaki Ito, Aichi-ken (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 10/837,943

(22) Filed: May 3, 2004

(65) Prior Publication Data

US 2004/0200846 A1 Oct. 14, 2004

Related U.S. Application Data

(63) Continuation-in-part of application No. 10/098,716, filed on Mar. 15, 2002, now abandoned.

(51) Int. Cl.
*F16L 5/00* (2006.01)

(52) U.S. Cl. .................. 285/204; 285/423; 285/201

(58) Field of Classification Search ............... 285/211, 285/221, 422, 423, 55, 192, 136.1, 139.1, 285/139.2, 141.1, 204
See application file for complete search history.

(56) References Cited

U.S. PATENT DOCUMENTS

| | | | |
|---|---|---|---|
| 4,161,967 A | 7/1979 | Sprague | |
| 5,315,563 A | 5/1994 | Lichtenfels et al. | |
| 5,568,828 A * | 10/1996 | Harris | ........................ 141/348 |
| 5,678,590 A | 10/1997 | Kasugai et al. | |
| 6,019,348 A | 2/2000 | Powell | |
| 6,056,029 A | 5/2000 | Devall et al. | |
| 6,189,567 B1 * | 2/2001 | Foltz | ........................ 137/587 |
| 6,305,408 B1 | 10/2001 | Goto et al. | |
| 6,305,568 B1 | 10/2001 | Suzuki et al. | |
| 6,308,735 B1 | 10/2001 | Foltz | |
| 6,386,244 B1 * | 5/2002 | Brown et al. | ................... 141/1 |
| 6,502,607 B1 * | 1/2003 | Brown et al. | ................... 141/1 |

FOREIGN PATENT DOCUMENTS

| | | |
|---|---|---|
| DE | 19535413 | 2/1996 |
| JP | 2715870 | 2/1998 |

* cited by examiner

*Primary Examiner*—Aaron Dunwoody
(74) *Attorney, Agent, or Firm*—Andrus, Sceales, Starke & Sawall, LLP

(57) ABSTRACT

An cylindrical convex portion of which opposite ends are open is integrally formed onto a fuel tank made of HDPE therewith so as to inwardly extend in the fuel tank to provide an opening thereon. A press-fit portion of a filler hose connecting pipe made of PA as a tubular member is press-fitted in the cylindrical convex portion to connecting the tubular member to the fuel tank. At least one continuous annular projection is provided on the outer peripheral surface of the press-fit portion of the tubular member so as to bite into the inner peripheral surface of the cylindrical convex portion to provide continuous circumferential contact. A face of the annular projection in direction axially of one end of tubular member is formed so as to extend outwardly and inclinedly with respect to the axial direction of the tubular member form one end toward the other end thereof.

4 Claims, 14 Drawing Sheets

FIG. 12a
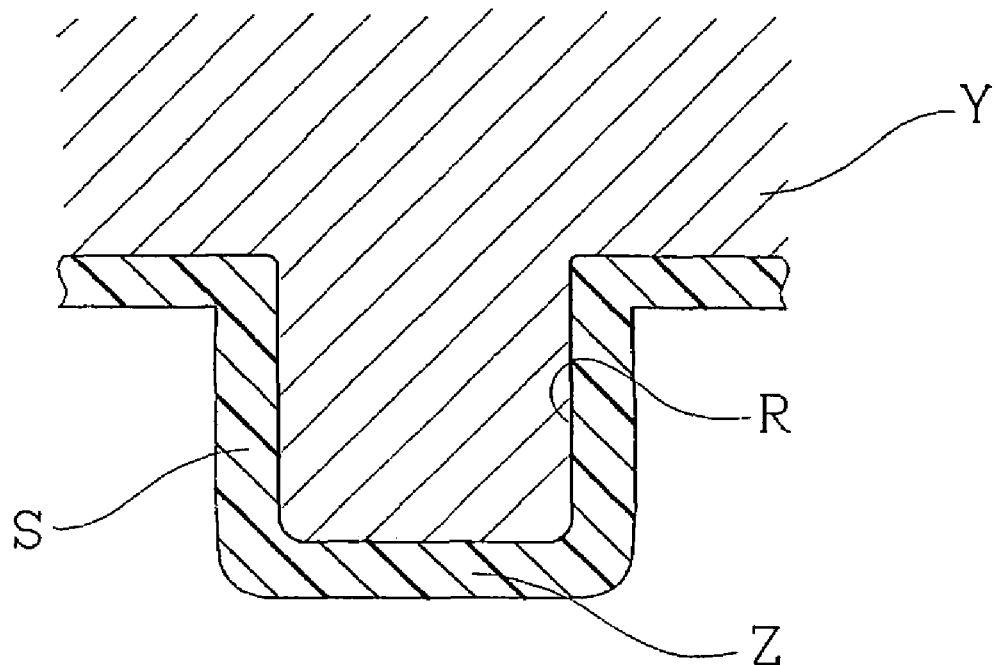
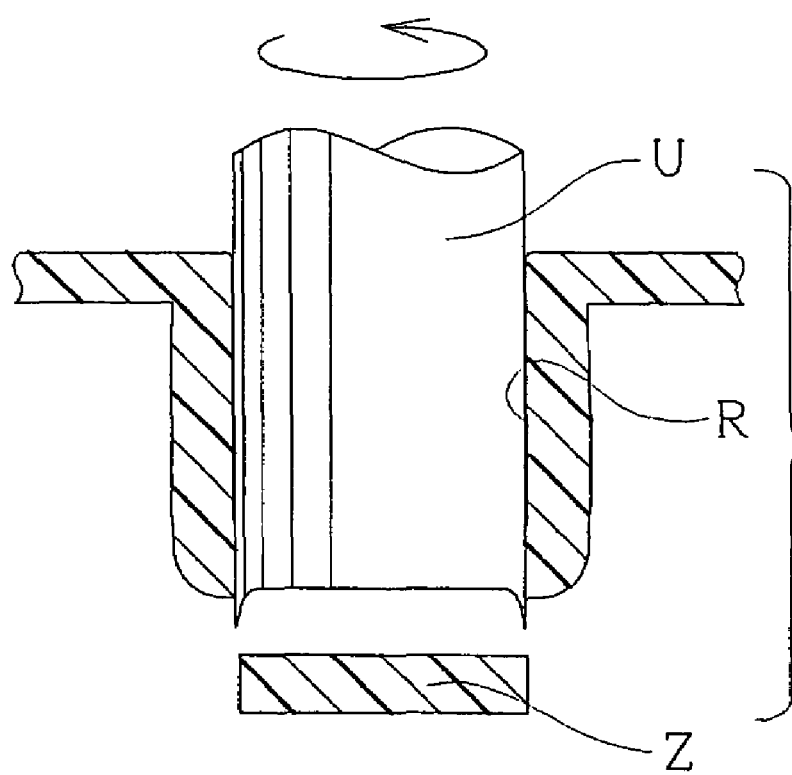
FIG. 12b

US 7,128,346 B2

STRUCTURE FOR CONNECTING TUBULAR MEMBER TO FUEL TANK

RELATED APPLICATION

This application is a Continuation-In-Part of U.S. patent application Ser. No. 10/098,716, entitled STRUCTURE FOR CONNECTING TUBULAR MEMBER TO FUEL TANK, filed on Mar. 15, 2002 now abandoned.

BACKGROUND OF THE INVENTION

The present invention relates to structure for connecting tubular member to fuel tank, such as hose connecting pipe or valve-housing, for example, for connecting to a fuel tank of an automobile.

FIG. 8 shows an example of a prior art fuel tank system which is installed in an automobile so that gasoline is fed to an engine. In this instance, gasoline is supplied in a fuel tank A through a filler hose B and a connecting pipe C, by means of a fueling gun (not shown) inserted into a filler pipe D connected to a filler hose B. Gasoline in the fuel tank A is fed to an engine by a fuel pump E through a feed hose F, and excess gasoline is collected through a return hose G into the fuel tank A. A communication pipe D-1 is branched from the upper portion of the filler pipe D, and a communication hose H, which is connected to the communication pipe D-1, is attached at the tip end portion thereof via a connecting pipe I to the fuel tank A. The tip end portion of the connecting pipe I extends into the fuel tank A, or stays in the fuel tank A in such a manner as to reach gasoline surface or liquid level therein when the fuel tank A is full-filled state. The fueling gun is equipped with a mechanism (not shown) which stops fueling automatically, when sensing that the tip end portion of the connecting pipe I stays under the surface of the gasoline (dips in gasoline) in the fuel tank A, that is, the tank A is full-filled state. And, an evaporative emission hose J is connected via roll over valves K, K to the fuel tank A at the upper portion thereof. Evaporated gasoline or gasoline vapor filled in the fuel tank A flows through the evaporative emission hose J to a canister. The roll over valves K, K are closed on occasion of an automobile rolling over, and the like, so as to prevent gasoline or fuel from flowing into the evaporative emission hose J.

Meanwhile, usually, a fuel tank A is made of thermoplastic resin material, due to reason that it is light weight, does not rust and is easily formed into designated shape, and so on. For example, a fuel tank A has a multi-layer composition, a layer or layers of high density polyethylene(HDPE), at least for an outermost layer, and an internal fuel barrier layer or layers such as polyamide(PA, nylon), or ethylene vinyl alcohol(EVOH) which are bonded or fused to the HDPE layer or layers respectively by a bonding layer or bonding material. HDPE is often applied also for a connecting pipe C to connect a filler hose B to a fuel tank A and a housing of roll over valve K In prior connecting structure shown in FIG. 9, a connecting pipe C is formed into a relatively elongated tubular member made of HDPE, with which a flange C-1 for fusing is integrally formed at the axial center thereof and in the inner peripheral surface of the connecting pipe C, a metallic cylindrical body L extending from the upper end to below the axial center of the connecting pipe C is provided. The connecting pipe C thus configured is inserted into an opening M of the fuel tank A, comprising an outer layer N made of HDPE, an inner layer O made of HDPE and a fuel barrier layer P made of PA therebetween, and fixed onto the fuel tank A(outer layer N made of HDPE) by fusing the flange C-1 of the connecting pipe C thereto.

In some cases, the connecting pipe C itself is made of thermoplastic resin having good gasoline permeability resistance such as PA, and the connecting pipe C thus configured is fused and fixed onto the fuel tank A. Usually a connecting pipe C made of PA cannot be directly fused onto a fuel tank A made of HDPE. However, Japanese Patent No.2715870 and German Patent No. 19535413(DE19535413C1) disclose inventions relating to fixing a PA tubular member onto an opening of the HDPE fuel tank by means of bonding member or bonding material(bonding member layer). And, a prior art technology shown in FIG. 10 is actually applied for connecting a connecting pipe to a fuel tank. In connecting structure with application of bonding materials for fusing shown in FIG. 10, a bonding member layer Q of modified polyethylene (modified PE) compatible with PA, is beforehand bonded or fused onto the back surface of a flange C-2 of the PA connecting pipe C, and is fused onto the surface of the rim portion of the opening M(surface layer or outer layer N of HDPE) provided on the fuel tank A when connecting pipe C the connecting to the fuel tank A, so that the connecting pipe C is fixed onto the fuel tank A.

However, in the connecting structure shown in FIG. 9, evaporated gasoline or gasoline might penetrate in a clearance created between the outer surface of the connecting pipe C and the rim or the inner peripheral surface of the opening M, and might permeate through the HDPE flange C-1 having insufficient gasoline permeability resistance (refer to arrows in FIG. 9), resulting in permitting evaporated gasoline (vapor fuel) to diffuse or flow out into the air. And, even in the connecting structure shown in FIG. 10, since modified PE used for a bonding member layer Q is usually inferior to HDPE used for the fuel tank A in gasoline permeability resistance, evaporated gasoline could permeate through the bonding member layer Q and diffuses out into the air (refer to arrows in FIG. 10).

SUMMARY OF THE INVENTION

Therefore, it is an object of the present invention to provide a structure to connect a resin tubular member to a resin fuel tank having good fuel gas permeability resistance, more particularly, good gasoline permeability resistance at a connecting portion therebetween.

In the present invention, applied are a fuel tank wherein a cylindrical convex portion or cylindrical raised portion is integrally formed at a predetermined portion with the fuel tank in order to provide an opening thereon, and a tubular member wherein a side of one axial end or one axial end portion thereof is defined as press-fit portion, and at least one annular projection is integrally formed with the press-fit portion on the outer surface thereof so as to bite into the inner peripheral surface of the cylindrical convex portion. And a face of the annular projection in direction axially of one end of the tubular member should be extending outwardly and inclinedly with respect to the axial direction of the tubular member from one end toward the other end thereof or in frusto-conical shape. The annular projection is formed so as to extend circumferentially continuously, or extend continuously along an entire circumference of the tubular member. And, the press-fit portion of the tubular member is press-fitted in the cylindrical convex portion so as the annular projection of the press-fit portion of the tubular member bites into the inner peripheral surface of the cylindrical convex portion, more specifically, bites into the inner peripheral surface of the cylindrical convex portion along an entire circumference thereof or in a manner providing continuous circumferential contact between the annular projection and the inner peripheral surface of the cylindrical convex portion, resulting in connecting the tubular member to the fuel tank. With structure to connect a tubular member to a fuel tank of the present invention, a tubular member is connected to a fuel tank by simple means of press-fitting of the tubular member into the cylindrical convex portion, and at the same time, fuel permeability resistance, specifically gasoline permeability resistance is enhanced between the tubular member and the cylindrical convex portion or a fuel tank That is, the present invention can provide a tubular member connecting structure to a fuel tank with enhanced fuel vapor permeability resistance, specifically evaporated gasoline permeability resistance, which enables to connect a tubular member to a fuel tank simply by press-fitting. Usually, a plurality of openings are formed on a fuel tank and the present invention can be applied to all or a part of the openings. Since a face of the annular projection in direction of one axial end of the tubular member is extending outwardly and inclinedly with respect to the axial direction from one end toward the other end of the tubular member, or is tapered toward one end of the tubular member, in other words, the annular projection is formed with a conical taper diminishing toward one axial end of the tubular member, the annular projection travels within the cylindrical convex portion while expanding the inner peripheral surface thereof when the tubular member is inserted from one axial end thereof into the cylindrical convex portion or the opening of the fuel tank. As such, the tubular member is inserted into the cylindrical convex portion of the fuel tank to the designated extent provided by the length of the tubular member. In this state, at least a radial tip end, or a radial outer end of the annular projection bites into the inner peripheral surface of the cylindrical convex portion (that is, deforms the inner peripheral surface into recess, or into concavity and convexity), so that the press-fit portion of the tubular member is fixedly positioned within the cylindrical convex portion, and, at the same time, the clearance between the outer peripheral surface of the tubular member and the inner peripheral surface of the cylindrical convex portion is airtightly (sealingly) separated by the annular projection of the tubular member. Thus, there is little possibility that fuel or fuel vapor, especially gasoline or evaporated gasoline diffuses out through between the outer peripheral surface of the tubular member or the press-fit portion and the inner peripheral surface of the cylindrical convex portion. Preferably, more than one annular projection are disposed on the outer peripheral surface of the press-fit portion, in order to enhance the securing strength and the air-tightness between the cylindrical convex portion and the press-fit portion of the tubular member. It is effective for this purpose that a plurality of annular projections are disposed axially of the tubular member spaced apart thereon.

A tubular member press-fitted into the cylindrical convex portion is preferably so configured as to strongly secured to the cylindrical convex portion. Thus, to be more effective, a face of the annular projection in direction of the other axial end of the tubular member is formed so as to extend outwardly in a direction perpendicular to the axis of the tubular member, or so as to extend radially outwardly. In some case, the face is formed so as to extend inclinedly with respect to the axial direction from the other end toward one end of the tubular member, but at an obtuse angle with respect to the axis of the tubular member. And, in some case, the face is formed so as to extend inclinedly with respect to the axial direction from one end toward the other end of the tubular member.

It is possible in the present invention to make a tubular member of resin which does not have sufficient fuel or fuel vapor permeability resistance, specifically does not have sufficient gasoline or evaporated gasoline permeability resistance, for instance, HDPE or the like. Because, a clearance between the outer peripheral surface of the press-fit portion of the tubular member and the inner peripheral surface of the cylindrical convex portion in direction axially of the tubular member is limited or shut off due to the fact that an annular projection/projections of the press-fit portion of a tubular member bite into or engage with the inner peripheral surface of a cylindrical convex portion, and consequently, fuel or fuel vapor (specifically gasoline) impermeability or fuel or fuel vapor shut-off property is achieved between the cylindrical convex portion and the press-fit portion of the tubular member. However, if a number of an annular projection is small, for example, one, fuel or fuel vapor easily passes or permeates through the clearance. Even if more than one annular projection are disposed on the press-fit portion of a tubular member, and hence sufficient air-tightness is ensured between the outer peripheral surface of the press-fitted portion of the tubular member and the inner peripheral surface of the cylindrical convex portion, fuel or fuel vapor might permeate through a tubular member axially thereof in case of a tubular member of poor fuel permeation resistance. Therefore, a tubular member is preferably made of resin which has sufficient fuel or fuel vapor permeability resistance, specifically sufficient gasoline or evaporated gasoline permeability resistance, such as PA, fiber reinforced PA which is reinforced by glass fiber or the like, polyacetal (POM), nanocomposite HDPE, nanocomposite PA, polyphenylene sulfide(PPS) or the like. Nanocomposite plastic materials or nanocomposite polymer plastic materials, comprising resin such as HDPE or PA in which particles of clay mineral materials or clay such as laminated silicate are finely dispersed, have good fuel or fuel vapor permeability resistance, or good gasoline or evaporated gasoline permeability resistance, and are suitable materials for a tubular member. Especially, nanocomposite HDPE(HDPE nanocomposite) or nanocomposite PA (PA nanocomposite) is applicable for a tubular member.

The securing strength and air-tightness between a tubular member and a cylindrical convex portion is brought by the circumferentially continuous annular projection or annular projection extending continuously along an entire circumference thereof bit into the inner peripheral surface of a cylindrical convex portion, more specifically bit into the inner peripheral surface of the cylindrical convex portion along an entire circumference thereof or in a manner providing continuous circumferential contact between the annular projection and the inner peripheral surface of the cylindrical convex portion. However, as the tubular member is made of resin, in case that a tubular member has been press-fitted into the cylindrical convex portion for a long period, a tubular member is aged and is reduced in dimension. This results that the securing strength and the air-tightness between a tubular member and a cylindrical convex portion will be deteriorated, since the annular projection cannot sufficiently bites into the inner peripheral surface of a cylindrical convex portion. Therefore, preferably, a metallic cylindrical body is fixedly disposed in the inner peripheral surface of a tubular member at least at the press-fit portion, in order to prevent wear and decrease in dimension, resulted from aged press-fit portion of a tubular member.

Meanwhile, in case that a tubular member is, for example, a hose connecting pipe, a hose is fitted onto the side of the other axial end of a tubular member, and a hose is securely fastened onto a tubular member with fastening band, or the like for the purpose to ensure securing or connecting strength and air-tightness. Thus, such measures should be taken against decrease in dimension and wear of the other axial end portion or the side of the other axial end of a tubular member resulted from aging, or securing strength and air-tightness between the hose and the tubular member would be deteriorated. Therefore, it is effective to secure a metallic cylindrical body in a tubular member along the entire length thereof or substantially along the entire length thereof.

Preferably, a cylindrical convex portion is formed to extend inwardly inside a fuel tank Typically, a resin fuel tank is formed by blow molding In case that a cylindrical convex portion is, as shown in FIGS. 11a to 11c, formed outwardly of a fuel tank, blow pressure directly works against the inner peripheral surface R, to form a hollow cylindrical body S (FIG. 11a), at blow molding process. It might result in a rough inner peripheral surface R. Then, the top cover portion T of the hollow cylindrical body S is cut away with rotary cutter U and a cylindrical convex portion is formed (FIG. 11b). However, due to insufficient smoothness of an inner peripheral surface R of a cylindrical convex portion, when a tubular member V is inserted into a cylindrical convex portion, resulting in a portion W of the inner peripheral surface R where an annular projection X does not bite into or closely fit to the inner peripheral surface R of a cylindrical convex portion sufficiently. Consequently, it is most likely to cause insufficient securing strength or insufficient fuel vapor shutoff property, especially insufficient gasoline or evaporated gasoline shut-off property (FIG. 11c). On the contrary, as shown in FIGS. 12a and 12b, in case that a hollow cylindrical body S is formed to extend inwardly inside a fuel tank, the inner peripheral surface R is formed with being pressed against a metallic mold Y, at blow molding process (FIG. 12a). Therefore, it hardly results in rough inner peripheral surface R of a hollow cylindrical body S. Then, the bottom portion Z of a hollow cylindrical body S is cut away by rotary cutter U (FIG. 12b). Thus formed cylindrical convex portion is, due to satisfactory smoothness of the inner peripheral surface R, it never results in disadvantage with the one shown in FIG. 11, such as insufficient securing strength of the tubular member V, and insufficient fuel vapor shut-off property, especially gasoline shut-off property.

A flange is usually provided onto the outer peripheral surface of a tubular member, in order to limit a lengthwise portion of the tubular member to be press-fitted in the cylindrical convex portion. That is, a typical tubular member comprises a tubular body and a flange provided on the outer peripheral surface of a tubular body. It will further enhance air-tightness between a tubular member and a fuel tank, to dispose an elastic annular sealing member or elastic annular sealing members between a flange, circumferentially continuous flange or flange extending continuously along an entire circumference thereof and an outer face of a fuel tank.

BRIEF DESCRIPTION OF THE DRAWINGS

FIG. 12a is a schematic view of a preferred process of molding of a cylindrical convex portion where the cylindrical convex portion is formed so as to inwardly extend.

FIG. 12b is a schematic view showing that a bottom portion of a hollow cylindrical body of FIG. 12a is cut away by rotary cutter.

DETAILED DESCRIPTION OF THE INVENTION

Figure 1A:
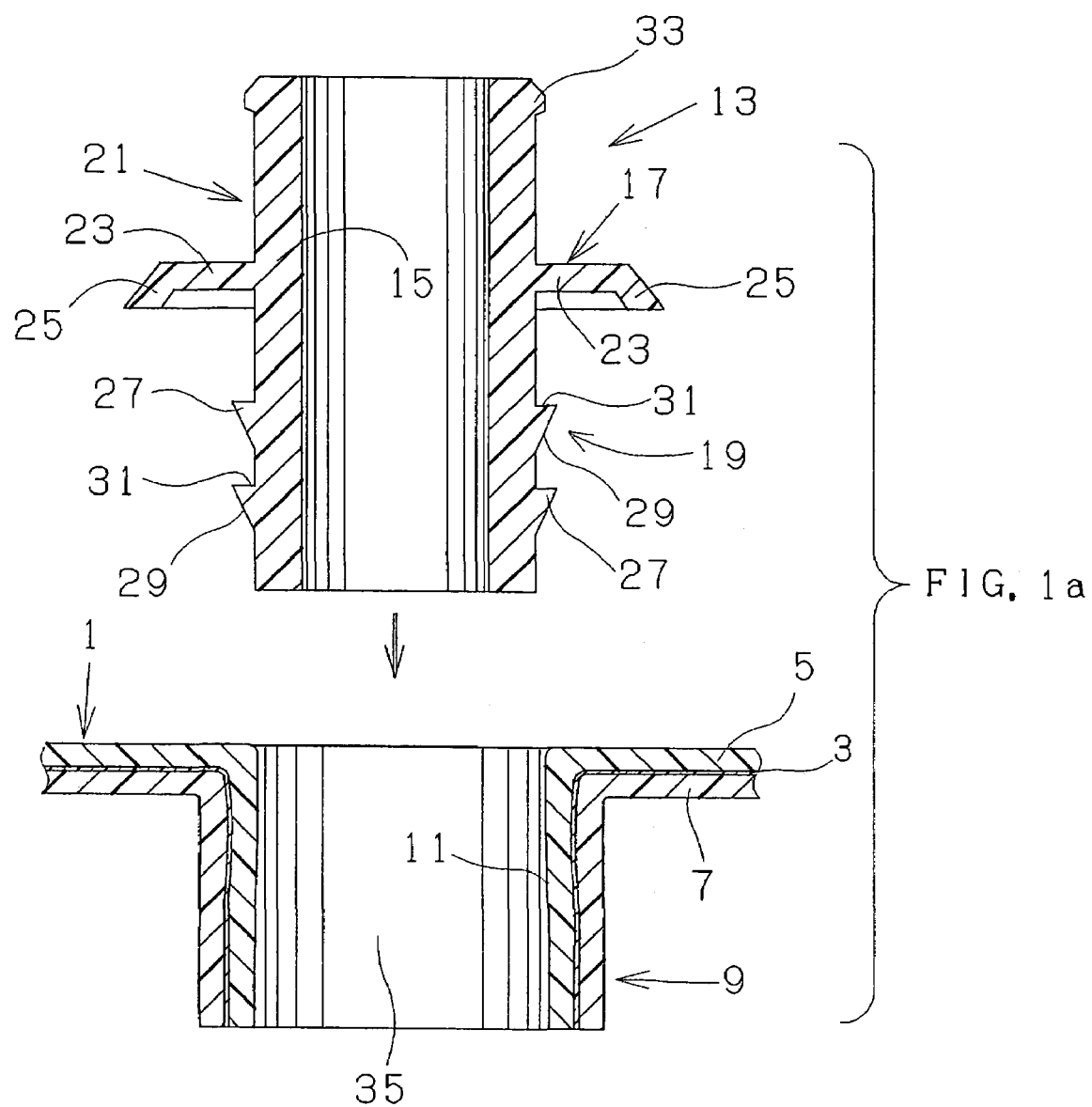
FIG. 1a is a schematic view showing connecting process between a filler hose connecting pipe and a fuel tank of an automobile in an embodiment of the present invention.
Figure 1B:
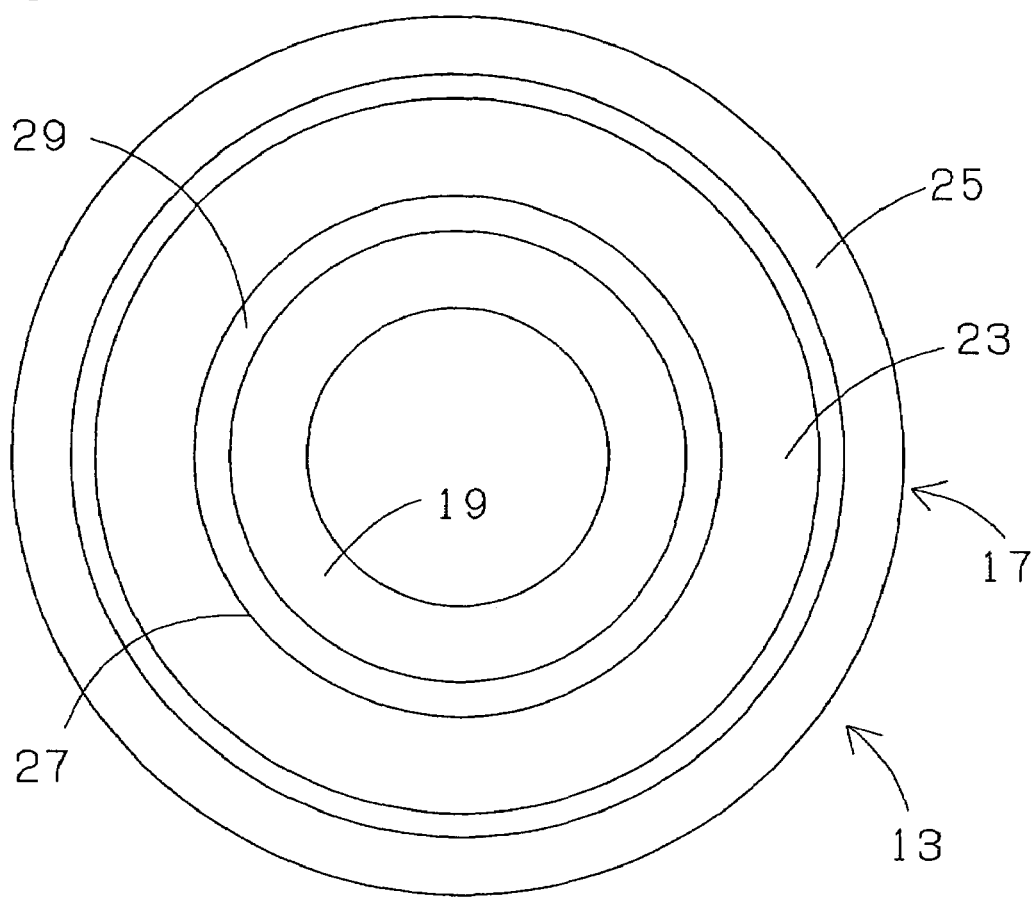
FIG. 1b is an enlarged bottom plan view of the filler hose connecting pipe.
Figure 2A:
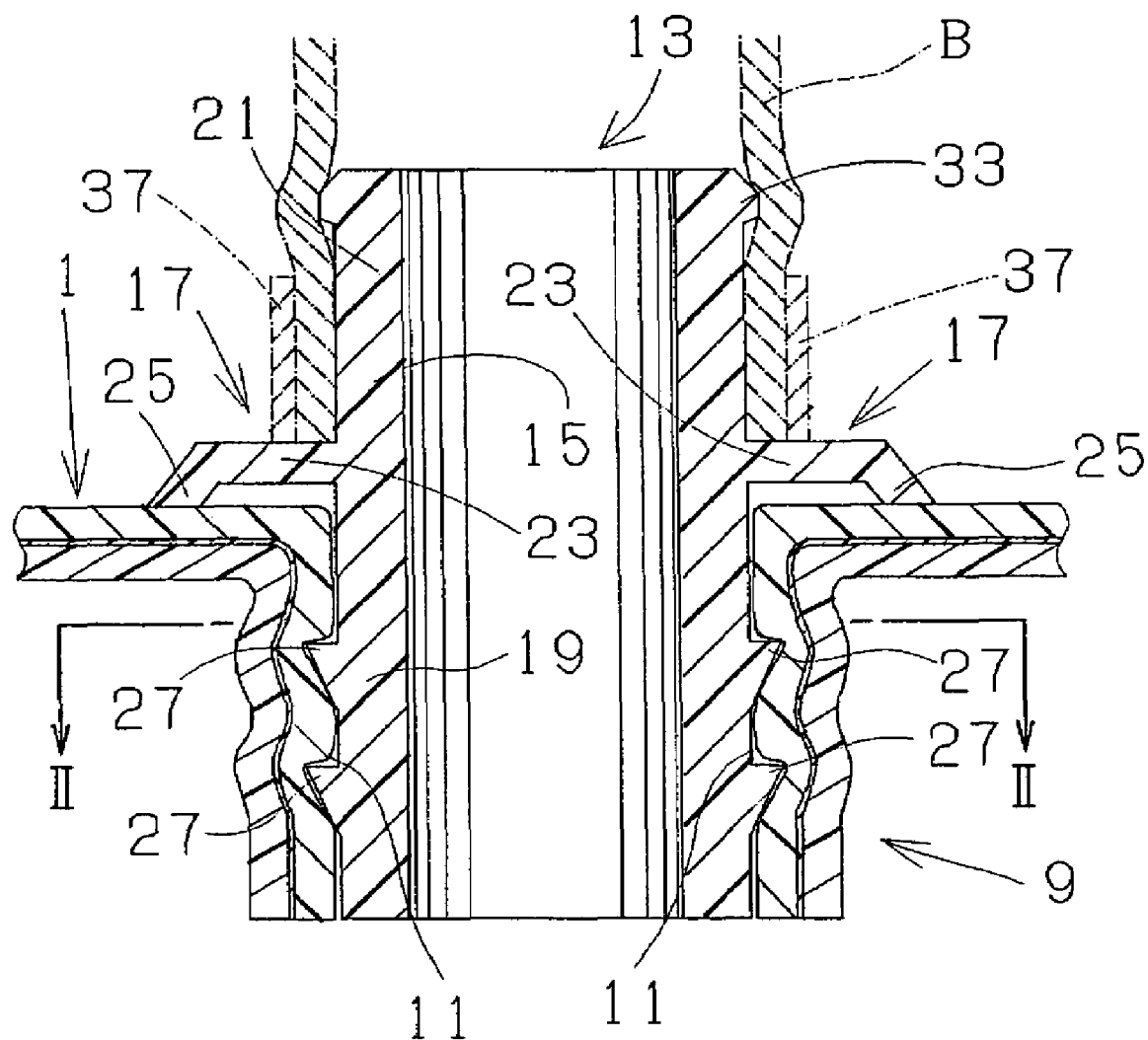
FIG. 2a is a sectional view taken longitudinally, showing a connecting structure between the filler hose connecting pipe and the fuel tank.
Figure 2B:
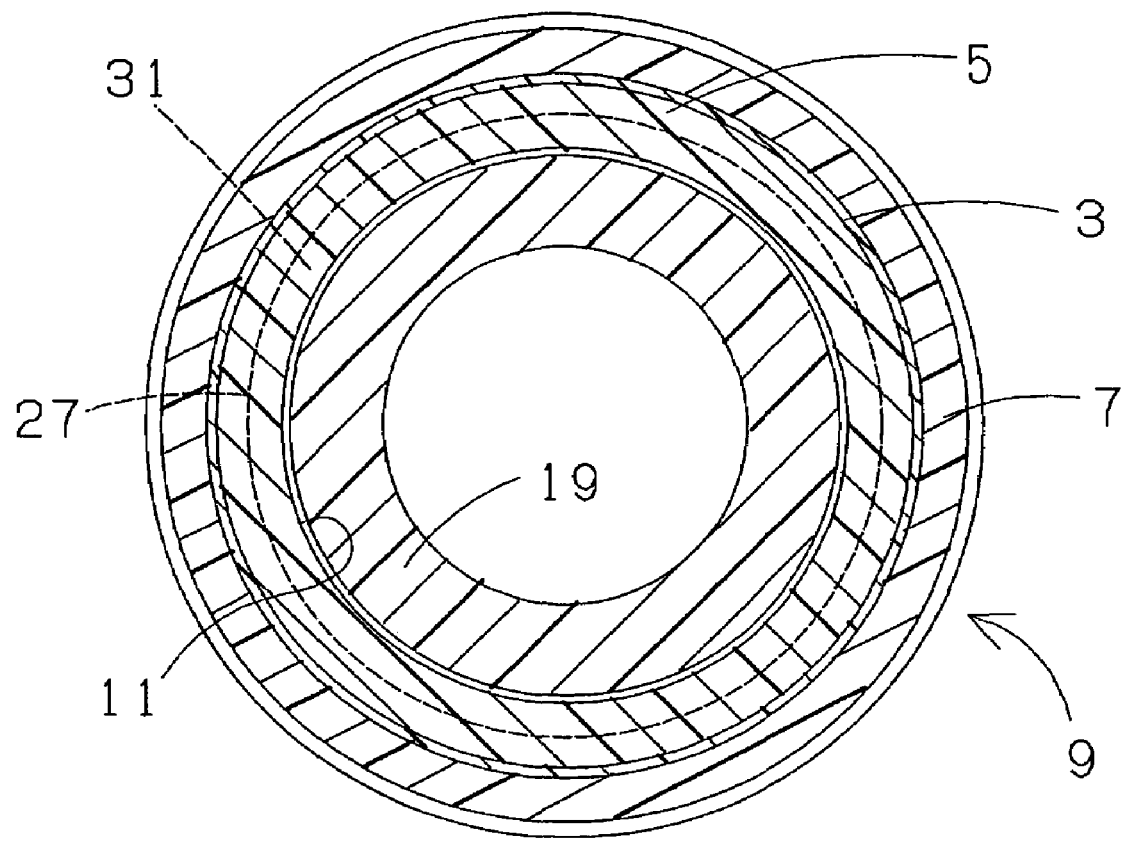
FIG. 2b is an enlarged sectional view taken along a line II—II of FIG. 2a, showing the connecting structure between the filler hose connecting pipe and the fuel tank

Referring to FIG. 1 and FIG. 2, it is understood that the present invention is applied for connecting structure between a fuel tank and a filler hose connecting pipe. A fuel tank 1 in this embodiment is blow-molded, and comprises multilayers of approximately 10 mm in thickness, wherein a middle gasoline barrier layer 3 made of PA is joined with material-to-material bond to an outer layer 5 made of HDPE, and to an inner layer 7 made of HDPE. An cylindrical convex portion 9, of which axial opposite ends are open, is formed extending inwardly in a fuel tank 1, so as to provide an opening thereof. The inner peripheral surface 11 of the cylindrical convex portion 9 has sufficient and satisfactory smoothness.

Figure 8:
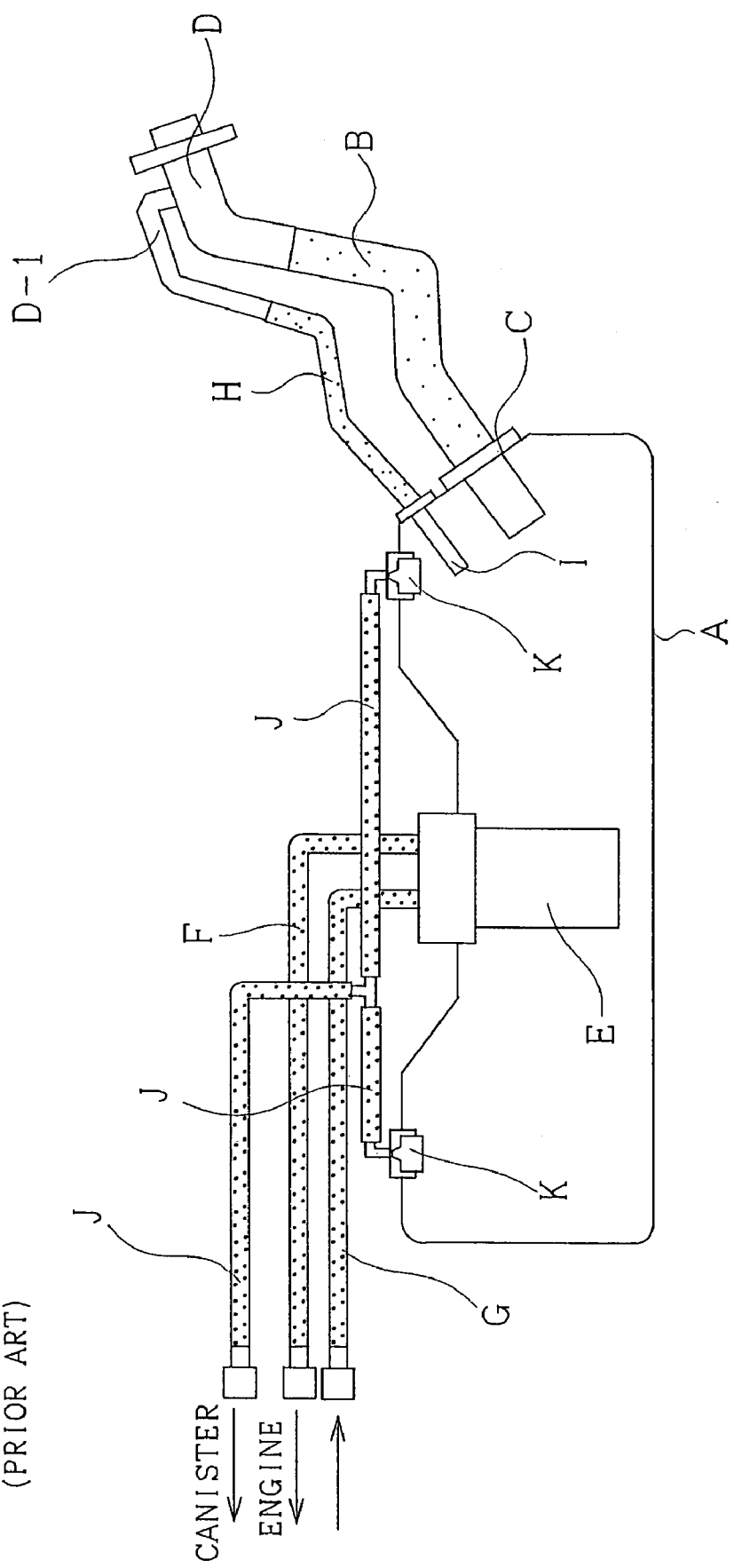
FIG. 8 is a schematic view illustrating a prior art structure of a fuel tank system of an automobile.
Figure 9:
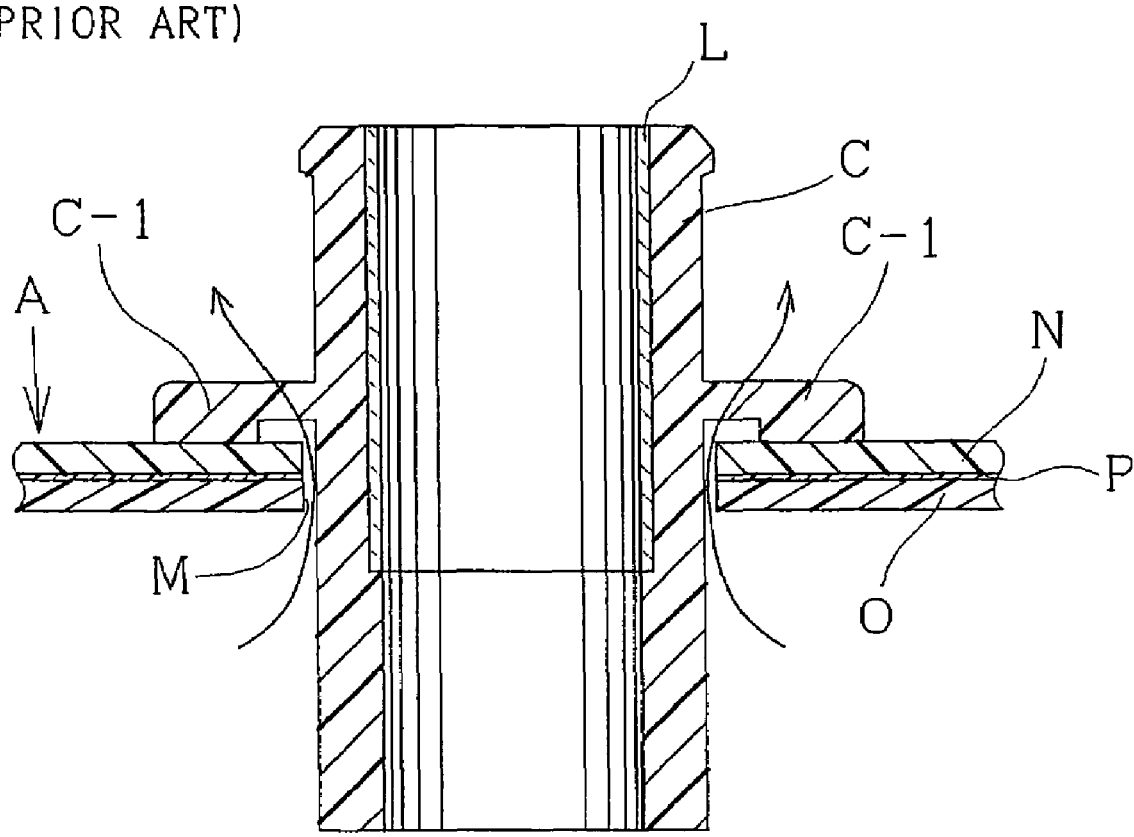
FIG. 9 is a cross sectional view showing a conventional prior art connecting structure of a tubular member.
Figure 10:
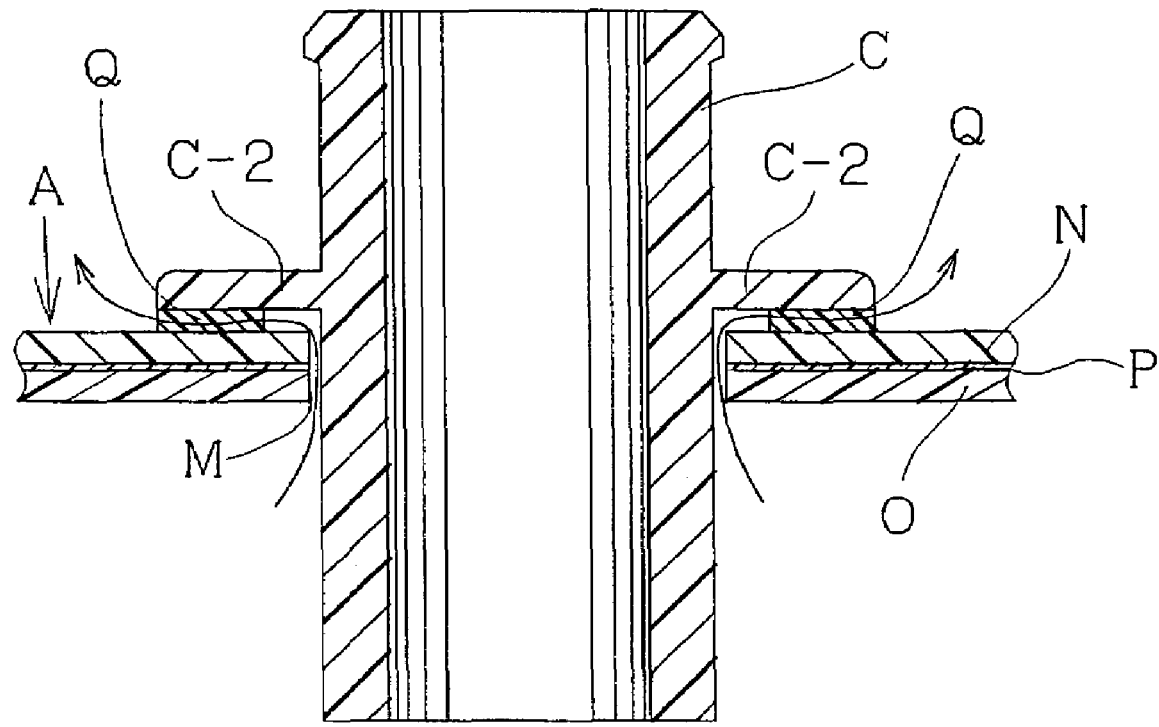
FIG. 10 is a cross sectional view showing another conventional prior art connecting structure of a tubular member.
Figure 11A:
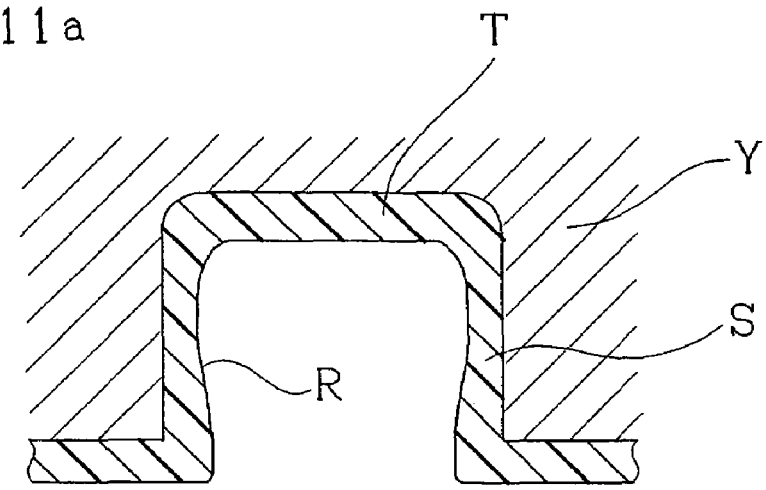
FIG. 11a is a schematic view showing a process of molding a cylindrical convex portion for connecting a tubular member to a fuel tank where the cylindrical convex portion is formed so as to outwardly extend.
Figure 11B:
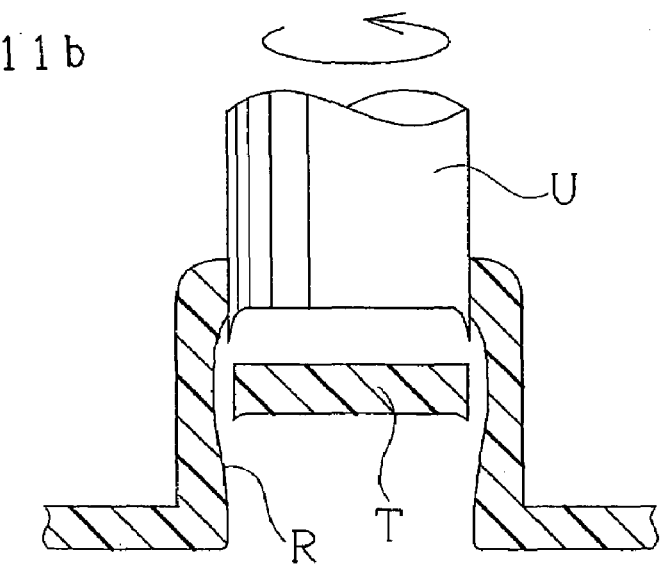
FIG. 11b is a schematic view showing that a top cover portion of the hollow cylindrical body of FIG. 11a is cut away with a rotary cutter and a cylindrical convex portion formed.
Figure 11C:
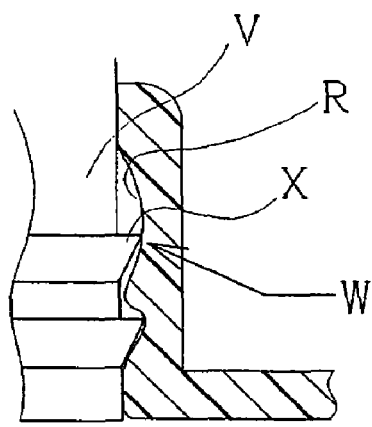
FIG. 11c is a schematic detail view of FIG. 11b showing that an annular projection does not bite into or closely fit to an inner peripheral surface of a cylindrical convex portion sufficiently.

A filler hose connecting pipe 13 (tubular member) comprises a pipe body 15 and a circumferentially continuous flange 17 integrally formed therewith substantially at the axial (longitudinal) center of the pipe body 15 on the outer peripheral surface thereof. The side in axial direction from the flange 17 toward one axial end of the pipe body 15 (inward end side) is defined as a press-fit portion 19, and the other side (outward end side) is defined as a hose connecting portion 21 of which outer surface is engaged in a filler hose B (refer to FIGS. 2 and 8). The flange 17 comprises a radial section 23 extending or diverging radially, and an abutment portion 25 which is formed integrally with the radial outer end of the radial section 23, extending in the axial direction of one end of the filler hose connecting pipe 13 and outwardly inclinedly. Two annular projections 27, 27, which extend circumferentially continuously, are disposed in axially spaced relationship on the outer peripheral surface of a press-fit portion 19 of a filler hose connecting pipe 13 or of a pipe body 15. A face 29 (inner face) in direction axially of one end of the tubular member 13 of each annular projection 27 has a line inclined at an angle of 20° to 30° or at an acute angle in relation to the axis of the pipe body 15 from one axial end toward the other axial end of the tubular member 13 in cross-sectional configuration, i.e., extends outwardly and inclinedly in the direction of the other axial end of the tubular member 13 or in frusto-conical shape. The other face 31 (outer face) in direction axially of the other end of the tubular member 13 of each annular projection 27 is formed of a face or an annular face so as to extend or expand generally radially. Thus, each annular projection 27 has substantially a right triangle shape in cross sectional configuration at any circumferential portion thereof. The other axial end portion of the hose connecting portion 21 (the other axial end portion of the filler hose connecting pipe 13 or of the pipe body 15: outer end portion) has an annular shoulder 33 thereon as slip-off preventive means when a filler hose B is engaged therewith. A filler hose connecting pipe 13 is made of resins of low gasoline permeability, at least of higher gasoline or evaporated gasoline permeability resistance compared to HDPE materials applied for an outer layer 5 and an inner layer 7 of the fuel tank 1(HDPE materials of the fuel tank 1), for example, nanocomposite HDPE, or nanocomposite PA, or fiberglass reinforced PA(nylon 6, nylon 66, nylon 11, nylon 12 or their blends).

A press-fit portion 19 of the filler hose connecting pipe 13 thus composed is press-fitted into through-hole 35(opening) of the cylindrical convex portion 9 formed on a fuel tank 1, until an abutment portion 25 of the flange 17 abuts against the fuel tank 1 on the surface thereof so as to connect a filler hose connecting pipe 13 to the fuel tank 1, as shown in FIG. 2. The annular projection 27 of the filler hose connecting pipe 13, respectively bites sufficiently into the inner peripheral surface 11 of the cylindrical convex portion 9 along an entire circumference thereof to ensure air-tightness between the filler hose connecting pipe 13 and the cylindrical convex portion 9. A filler hose B is engaged onto the outer peripheral surface of the hose connecting portion 21 of the filler hose connecting pipe 13, and is securely fastened against the hose connecting portion 21 with a fasting ring or collar 37.

Figure 3:
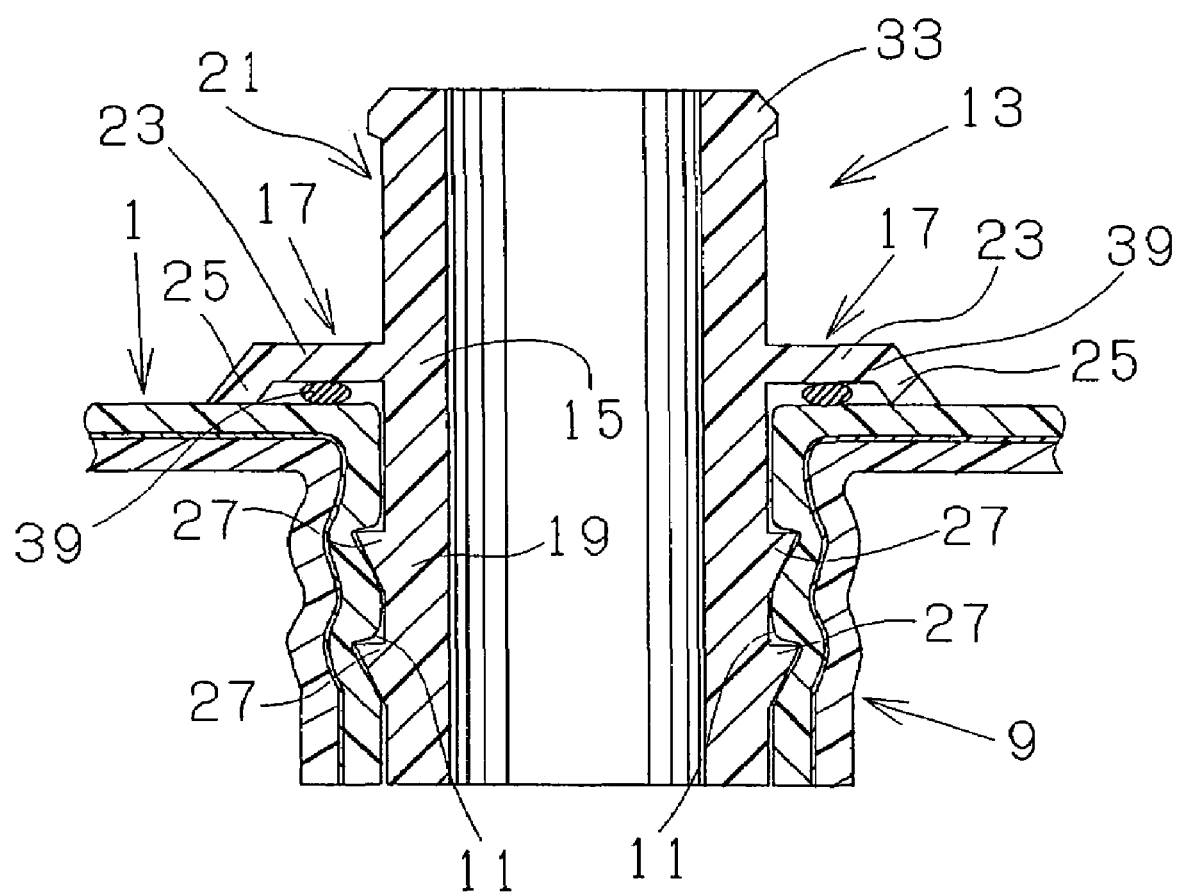
FIG. 3 is a cross sectional view showing another connecting structure between a filler hose connecting pipe and a fuel tank.

In another connecting structure between a fuel tank 1 and a filler hose connecting pipe 13 as another embodiment of the present invention, shown in FIG. 3, an annular elastic sealing member 39 is disposed between a radial section 23 of a flange 17 formed onto a filler hose connecting pipe 13 and a surface of the fuel tank 1. The annular elastic sealing member 39 is pressed and deformed properly between the flange 17 and a fuel tank 1, when the abutment portion 25 of the flange 17 abuts against the surface of the fuel tank 1, so as to provide air-tight sealing therebetween. Thus, even if evaporated gasoline flows out through the clearance between the filler hose connecting pipe 13 and the cylindrical convex portion 9, sealing property of the elastic sealing member 39 prevents evaporated gasoline from diffusing out. Preferably, a sealing member 39 is made of elastic materials of low gasoline permeability or low evaporated gasoline permeability.

Figure 4:
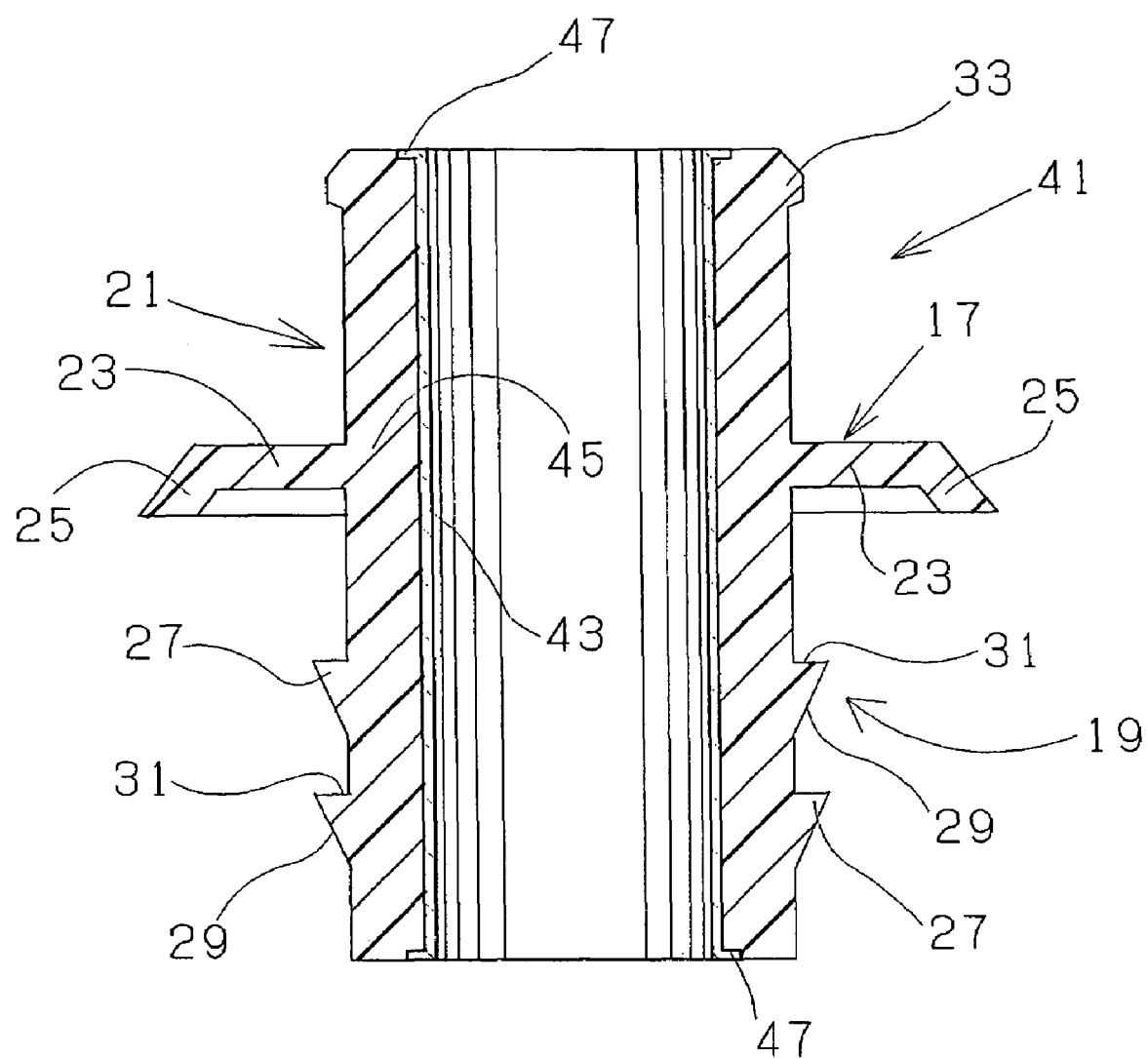
FIG. 4 is a cross sectional view showing another configuration of a filler hose connecting pipe.

A filler hose connecting pipe 41 (tubular member) of another configuration shown in FIG. 4 has modified configuration around the inner peripheral surface of the pipe body 15 of the filler hose connecting pipe 13. Therefore, roughly speaking, the portions of the same configuration as the filler hose connecting pipe 13 are referred to by the numerals identical to those of the filler hose connecting pipe 13, and descriptions on the portions identical to those of the filler hose connecting pipe 13 are herein omitted. A metallic cylindrical body 43 is fixedly disposed in the inner peripheral surface of the pipe body 45 of the filler hose connecting pipe 41, corresponding to the pipe body 15, along the entire length thereof. The metallic cylindrical body 43 has integrally narrow flanges 47, 47 therefrom on both opposite axial ends thereof. The filler hose connecting pipe 41 or the pipe body 45 is molded over the metallic cylindrical body 43 with the same resin material as used for the filler hose connecting pipe 13. In other words, the metallic cylindrical body 43 is insert molded in the filler hose connecting pipe 41 or the pipe body 45. The filler hose connecting pipe 41 can be connected to the fuel tank 1 by connecting structure shown in FIG. 2 (connecting structure without an annular elastic sealing member 39) as well as one shown in FIG. 3 (connecting structure with an annular elastic sealing member 39 between the radial section 23 of the flange 17 and the surface of the fuel tank 1).

Figure 5:
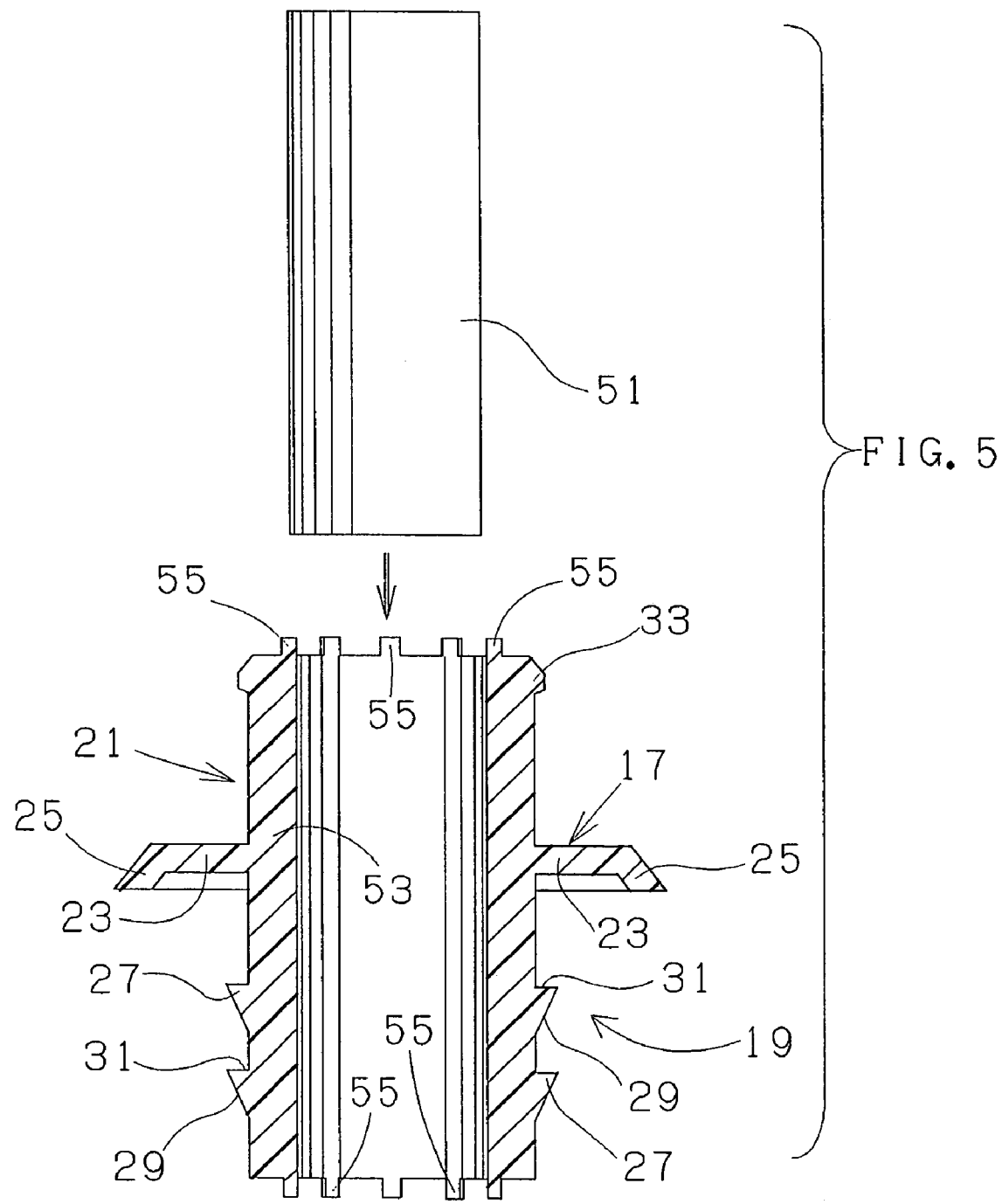
FIG. 5 is a schematic view showing production process of a filler hose connecting pipe with yet another configuration, in case that a metallic cylindrical body is inserted in a pipe body.
Figure 6:
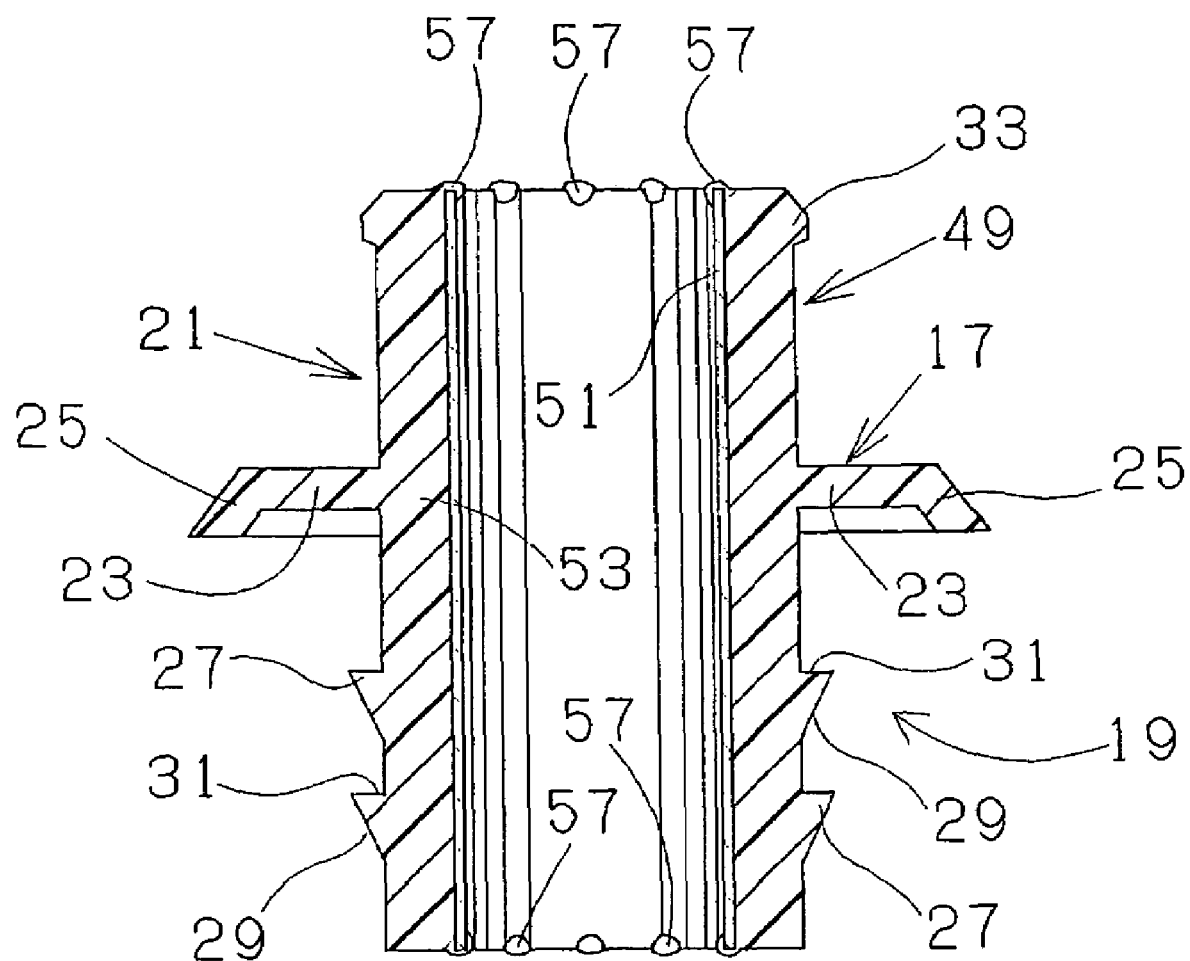
FIG. 6 is a schematic view showing production process of a filler hose connecting pipe with yet another configuration, in case that a metallic cylindrical body is fixedly disposed in a pipe body.
Figure 7:
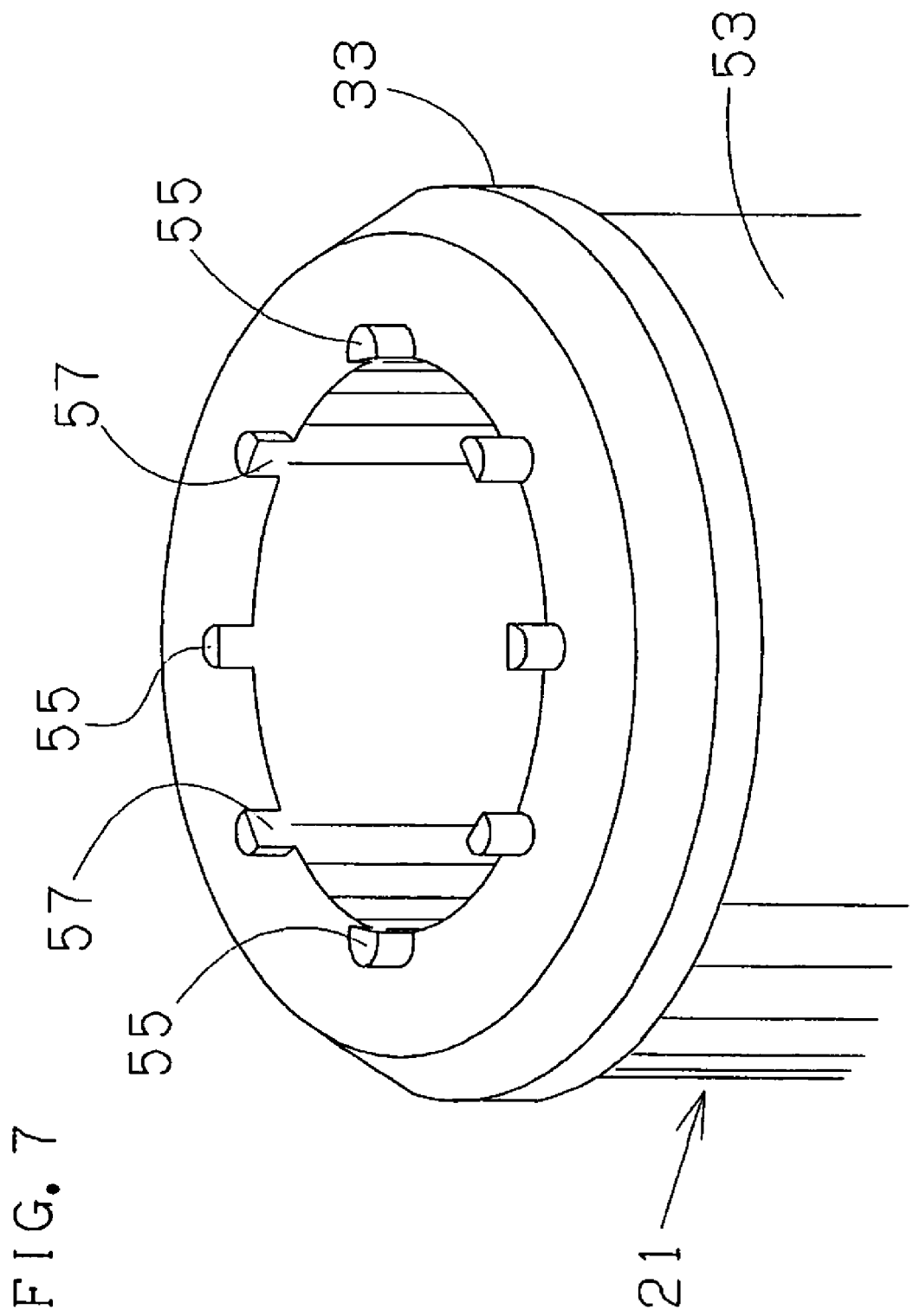
FIG. 7 is a perspective view showing configuration of securing ribs.

FIG. 5 and FIG. 6 show the preferred manufacturing method of a filler hose connecting pipe of yet another configuration in the preferred embodiment of the invention. A filler hose connecting pipe 49 (tubular member) has modified configuration around the inner surface of the pipe body 15 of the filler hose connecting pipe 13. Therefore, roughly speaking the portions configured same as the filler hose connecting pipe 13 are referred to by the same numerals as those of the filler hose connecting pipe 13, and descriptions on the portions identical to the filler hose connecting pipe 13 are herein omitted. A filler hose connecting pipe 49 also applies modified securing means of a metallic cylindrical body in the filler hose connecting pipe 41. A metallic cylindrical body 51 is fixedly disposed in the inner peripheral surface of the pipe body 53 of the filler hose connecting pipe 49, corresponding to the pipe body 15 along the entire length thereof. A pipe body 53 having the flange 17 is formed with same resin as the filler hose connecting pipe 13, and after that, a metallic cylindrical body 51 is inserted(refer to FIG. 5) and fixed into the pipe body 53. In order to fix the metallic cylindrical body 51, a plurality of securing ribs 55 are integrally formed with and disposed on the opposite axial end surfaces of the pipe body 53 along the rim of the apertures or the rim of the edge or end of the through-hole of the pipe body 53 respectively(in this embodiment, eight securing ribs 55 are disposed in circumferential direction in equally spaced relationship). The securing ribs 55 are formed at the same time when the pipe body 53 is formed. The securing ribs 55 are fused after the metallic cylindrical body 51 is inserted into the pipe body 53, resulting that fused ribs 55 cover the opposite axial edge or end portions including the inner surfaces of the opposite edge or end portions of the metallic cylindrical body 51 so as to form securing portions 57 preventing slipping the metallic cylindrical body 51 off from the pipe body 53(refer to FIG. 6). Since the securing ribs 55 are formed so as the inner surfaces 59 thereof are coplanar with the edge or end of the inner peripheral surface or the apertures of the pipe body 53 as shown in FIG. 7, the securing portions 57 to cover and fix the opposite edge or end portions of the metallic cylindrical body 51 is easily formed by fusing. The filler hose connecting pipe 49 can be connected to the fuel tank 1 by connecting structure shown in FIG. 2 (connecting structure without an annular elastic sealing member 39) as well as the one shown in FIG. 3 (connecting structure with an annular elastic sealing member 39 between the radial section 23 of the flange 17 and the surface of the fuel tank 1).

We claim:

1. A structure for connecting a tubular member to a fuel tank comprising:
   a fuel tank made of resin;
   a tubular member made of resin and provided with a press-fit portion on a side of one axial end thereof so as to be fixedly connected to an opening formed on the fuel tank;
   a cylindrical convex portion formed integrally with the fuel tank to define the opening;
   at least one continuous annular projection integrally formed with the tubular member on an outer peripheral surface of the press-fit portion, a face of the annular projection in direction axially of one end of the tubular member being formed so as to extend outwardly and inclinedly with respect to the axial direction of the tubular member from one end toward the other end thereof;
   a metallic cylindrical body fixedly disposed in the inner peripheral surface of the tubular member, at least at the press-fit portion; and
   the press-fit portion being press-fitted into the cylindrical convex portion such that the annular projection bites into an inner peripheral surface of the cylindrical convex portion in a manner providing continuous circumferential contact between the annular projection and the inner peripheral surface of the cylindrical convex portion.

2. A structure for connecting a tubular member to a fuel tank according to claim 1, wherein the metallic cylindrical body is fixedly disposed in the inner peripheral surface of the tubular member at entire length thereof, or generally at entire length thereof.

3. A structure for connecting a tubular member to a fuel tank, comprising:
   a fuel tank made of resin;
   a tubular member made of resin and provided with a press-fit portion on a side of one axial end thereof so as to be fixedly connected to an opening formed on the fuel tank;
   a cylindrical convex portion formed integrally with the fuel tank to define the opening; and
   at least one continuous annular projection integrally formed with the tubular member on an outer peripheral surface of the press-fit portion, a face of the annular projection in direction axially of one end of the tubular member being formed so as to extend outwardly and inclinedly with respect to the axial direction of the tubular member from one end toward the other end thereof;
   wherein the press-fit portion being press-fitted into the cylindrical convex portion such that the annular projection travels within the cylindrical convex portion while expanding an inner peripheral surface of the cylindrical convex portion, and the annular projection bites into the inner peripheral surface of the cylindrical convex portion in a manner providing continuous circumferential contact between the annular projection and the inner peripheral surface of the cylindrical convex portion;
   wherein a clearance between an outer peripheral surface of the tubular member and the inner peripheral surface of the cylindrical convex portion is air-tightly separated by the annular projection of the tubular member; and
   wherein the cylindrical convex portion is formed so as to extend into the fuel tank.

4. A structure for connecting a tubular member to a fuel tank according to claim 3, wherein the tubular member has a flange on the outer peripheral surface of the tubular member and at least one annular elastic sealing member is disposed between the flange and the outer surface of the fuel tank,
   wherein the flange has a radially extending section, and an abutment portion which is formed with the radial outer end of the radially extending section, extending in the axial direction of one end of the tubular member, and
   wherein the elastic sealing member is pressed and deformed between the radially extending section and the outer surface of the fuel tank while the abutment portion abuts against the outer surface of the fuel tank.

* * * * *